United States Patent
Ishibashi

(10) Patent No.: US 9,542,909 B2
(45) Date of Patent: Jan. 10, 2017

(54) IMAGE PROCESSING APPARATUS AND IMAGE PROCESSING METHOD

(71) Applicant: Panasonic Intellectual Property Management Co., Ltd., Osaka (JP)

(72) Inventor: Yudai Ishibashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 15 days.

(21) Appl. No.: 14/623,122

(22) Filed: Feb. 16, 2015

(65) Prior Publication Data
US 2015/0235388 A1 Aug. 20, 2015

(30) Foreign Application Priority Data

Feb. 18, 2014 (JP) ................................. 2014-028057
Dec. 18, 2014 (JP) ................................. 2014-256713

(51) Int. Cl.
| | | |
|---|---|---|
| G06T 11/00 | (2006.01) | |
| G06T 1/60 | (2006.01) | |
| G09G 5/02 | (2006.01) | |
| G06T 1/20 | (2006.01) | |
| G06T 15/50 | (2011.01) | |

(52) U.S. Cl.
CPC ................ G09G 5/026 (2013.01); G06T 1/20 (2013.01); G06T 15/503 (2013.01); G06T 2210/62 (2013.01); G09G 2340/10 (2013.01)

(58) Field of Classification Search
None
See application file for complete search history.

(56) References Cited

U.S. PATENT DOCUMENTS

| | | | | |
|---|---|---|---|---|
| 6,081,804 A | * | 6/2000 | Smith | ............... G06F 17/30985 707/696 |
| 8,253,752 B2 | * | 8/2012 | Raveendran | ............ G06T 5/007 345/472 |
| 2006/0087556 A1 | * | 4/2006 | Era | ....................... H04N 13/026 348/51 |
| 2014/0270504 A1 | * | 9/2014 | Baum | ................ G06K 9/00744 382/165 |

FOREIGN PATENT DOCUMENTS

JP 2010-238110 A 10/2010

* cited by examiner

*Primary Examiner* — Zhengxi Liu
*Assistant Examiner* — Yanna Wu
(74) *Attorney, Agent, or Firm* — McDermott Will & Emery LLP

(57) ABSTRACT

An image processing apparatus including: an acquisition unit that acquires a first image, a second image, and an identifier indicating whether or not a portion corresponding to the first image and included in a third image is to be subjected to a second process; a first processing unit that (i) performs a first process on the first and second images acquired by the acquisition unit to generate the third image and (ii) performs conversion on a α blend value of each pixel forming the generated third image for allocating the identifier to a portion of a possible range of the α blend value; and a second processing unit that controls whether to perform the second process on each pixel forming the third image generated by the first processing unit, on the basis of the converted α blend value.

7 Claims, 10 Drawing Sheets

FIG. 2

COMPLETE TRANSPARENCY ←→  COMPLETE OPACITY ←→

| a2 | 0 | 1 | 2 | 3 | 4 | 5 | 6 | 7 | ... | 254 | 255 |
|----|---|---|---|---|---|---|---|---|-----|-----|-----|
| ID | 3 | 0 | 3 | 1 | 3 | 2 | 3 | 3 | ... | 3   | 3   |

ALLOCATION ORDER →

FIG. 5

| A (1, 1) | A (1, 2) | A (1, 3) | A (1, 4) | B (1, 5) | B (1, 6) | B (1, 7) | B (1, 8) |
|---|---|---|---|---|---|---|---|
| A (2, 1) | A (2, 2) | A (2, 3) | A (2, 4) | A (2, 5) | B (2, 6) | B (2, 7) | B (2, 8) |
| A (3, 1) | A (3, 2) | A (3, 3) | A (3, 4) | A (3, 5) | A (3, 6) | B (3, 7) | D (3, 8) |
| C (4, 1) | A (4, 2) | A (4, 3) | A (4, 4) | A (4, 5) | A (4, 6) | D (4, 7) | D (4, 8) |
| C (5, 1) | C (5, 2) | D (5, 3) | D (5, 4) | D (5, 5) | D (5, 6) | D (5, 7) | D (5, 8) |
| C (6, 1) | C (6, 2) | C (6, 3) | D (6, 4) | D (6, 5) | D (6, 6) | D (6, 7) | D (6, 8) |
| C (7, 1) | C (7, 2) | C (7, 3) | C (7, 4) | E (7, 5) | E (7, 6) | E (7, 7) | E (7, 8) |
| C (8, 1) | C (8, 2) | C (8, 3) | E (8, 4) | E (8, 5) | E (8, 6) | E (8, 7) | E (8, 8) |

| ID | 1 |
|---|---|
| a0 | 20 |

(b)

| PIXEL | D (4, 7) |
|---|---|
| a1 | 23 |

(c)

| PIXEL | D (4, 7) |
|---|---|
| a2 | 3 |

FIG. 7

| A (1, 1) | A (1, 2) | A (1, 3) | A (1, 4) | B (1, 5) | B (1, 6) | B (1, 7) | B (1, 8) |
|---|---|---|---|---|---|---|---|
| A (2, 1) | A (2, 2) | A (2, 3) | A (2, 4) | A (2, 5) | B (2, 6) | B (2, 7) | B (2, 8) |
| A (3, 1) | A (3, 2) | A (3, 3) | A (3, 4) | A (3, 5) | A (3, 6) | B (3, 7) | D (3, 8) |
| C (4, 1) | A (4, 2) | A (4, 3) | A (4, 4) | A (4, 5) | A (4, 6) | B/D (4, 7) | D (4, 8) |
| C (5, 1) | C (5, 2) | D (5, 3) | D (5, 4) | D (5, 5) | D (5, 6) | D (5, 7) | D (5, 8) |
| C (6, 1) | C (6, 2) | C (6, 3) | D (6, 4) | D (6, 5) | D (6, 6) | D (6, 7) | D (6, 8) |
| C (7, 1) | C (7, 2) | C (7, 3) | C (7, 4) | E (7, 5) | E (7, 6) | E (7, 7) | E (7, 8) |
| C (8, 1) | C (8, 2) | C (8, 3) | E (8, 4) | E (8, 5) | E (8, 6) | E (8, 7) | E (8, 8) |

(b)
| PIXEL | B (2, 7) |
|---|---|
| a1 | 5 |

(c)
| PIXEL | B (2, 7) |
|---|---|
| a2 | 4 |

FIG. 9

(a)
| PIXEL | D (4, 7) |
|---|---|
| a2 | 3 |

(b)
| PIXEL | D (4, 7) |
|---|---|
| a2 | 255 |

(c)
| PIXEL | D (4, 7) |
|---|---|
| a0 | 255 |

IMAGE PROCESSING APPARATUS AND IMAGE PROCESSING METHOD

RELATED APPLICATIONS

This application claims the benefit of Japanese Application No. 2014-02857, filed on Feb. 18, 2014 and Japanese Application No. 2014-256713, filed on Dec. 18, 2014, the disclosures of which Applications are incorporated by reference herein.

BACKGROUND

1. Field

The present disclosure relates to an image processing apparatus and an image processing method.

2. Description of the Related Art

Japanese Patent Unexamined Publication No. 2010-238110 discloses an image processing apparatus that can arbitrarily draw a color outline in a portion requiring an outline while using post-effect processing with a small amount of processing load as basic processing.

SUMMARY

An image processing apparatus according to the present disclosure performs a first process and a second process. The first process is image processing that integrates a first image which has color information including a brightness of each pixel forming the image and an $\alpha$ blend value, which is a coefficient indicating a transparency of each pixel, and a second image having color information to generate a third image having color information. The second process is image processing for the third image. The image processing apparatus comprises: an acquisition unit that acquires the first image, the second image, and an identifier indicating whether or not a portion corresponding to the first image and included in the third image is to be subjected to the second process; a first processing unit that (i) performs the first process on the first and second images acquired by the acquisition unit to generate the third image and (ii) performs conversion on the $\alpha$ blend value of each pixel forming the generated third image for allocating the identifier to a portion of a possible range of the $\alpha$ blend value; and a second processing unit that controls whether or not to perform the second process on each pixel forming the third image generated by the first processing unit, on the basis of the converted $\alpha$ blend value.

BRIEF DESCRIPTION OF DRAWINGS

FIG. 2 is a diagram illustrating the relationship between an $\alpha 2$ blend value and a material ID allocated by a control unit of the image processing apparatus according to the exemplary embodiment;

FIG. 5 is a diagram illustrating a first example of an image which has been subjected to the graphics processing and includes a plurality of materials in the exemplary embodiment;

FIG. 6 is a diagram illustrating a first example of the graphics processing for an $\alpha$ blend value in the exemplary embodiment;

FIG. 7 is a diagram illustrating a second example of the image which has been subjected to the graphics processing and includes a plurality of materials in the exemplary embodiment;

FIG. 8 is a diagram illustrating a second example of the graphics processing for the $\alpha$ blend value in the exemplary embodiment;

FIG. 9 is a diagram illustrating a third example of the graphics processing for the $\alpha$ blend value in the exemplary embodiment;

DETAILED DESCRIPTION

Hereinafter, an exemplary embodiment will be described in detail with reference to the accompanying drawings. Note that there are cases where descriptions in greater detail than necessary will not be given. For example, there are cases where detailed descriptions will not be given for well-known matters or redundant descriptions will not be given for substantially the same configuration. The purpose of this is to avoid unnecessary redundancy in the following description and to facilitate understanding by those skilled in the art.

The inventors provide the accompanying drawings and the following description for sufficient understanding of the present disclosure by those skilled in the art, but the accompanying drawings and the following description are not intended to limit the subject matter recited in the claims.

(Exemplary Embodiment)

In this exemplary embodiment, an image processing apparatus which reduces memory capacity required for image processing will be described.

[1-1. Structure]

Figure 1:
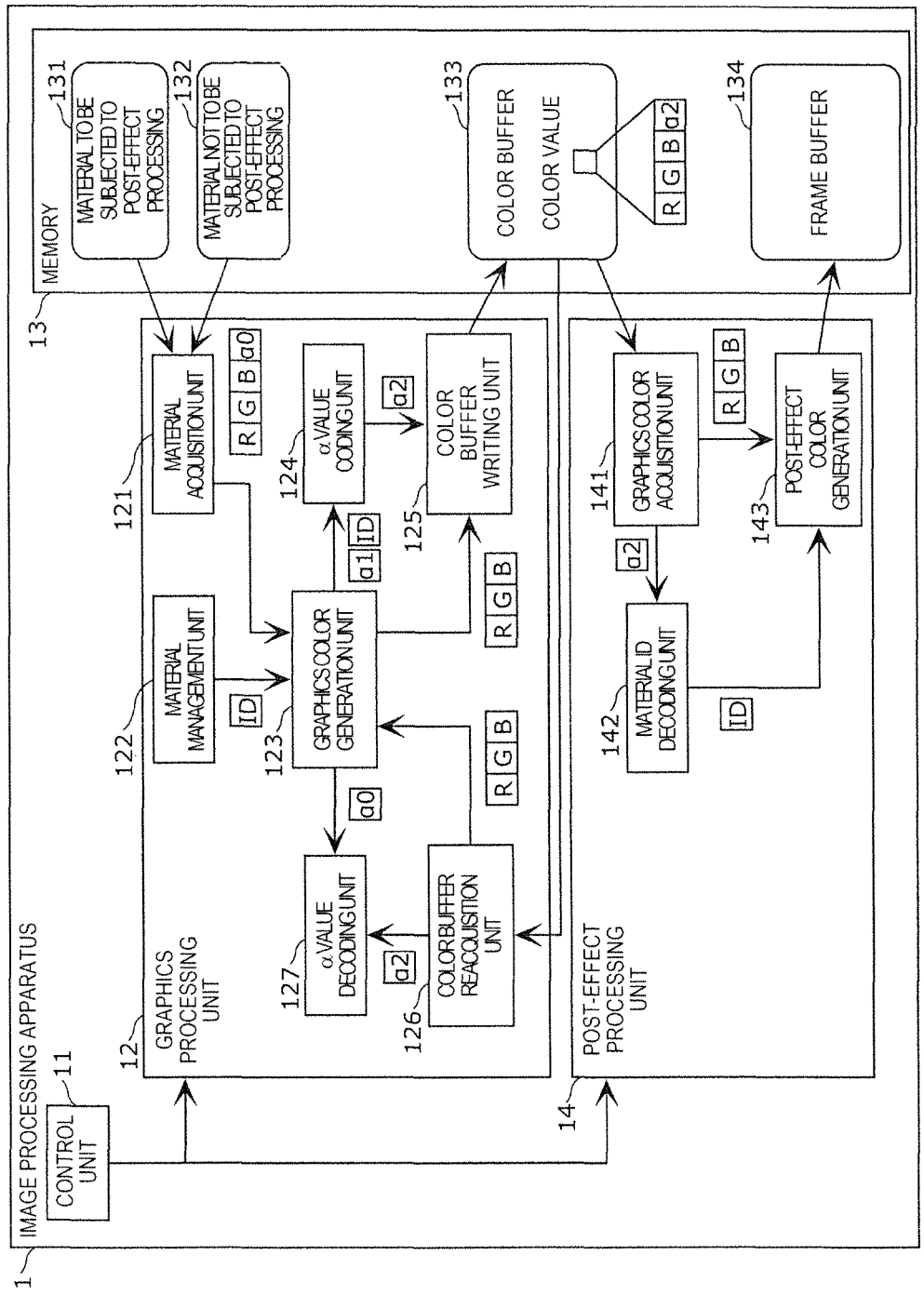
FIG. 1 is a block diagram illustrating the structure of an image processing apparatus according to an exemplary embodiment.

FIG. 1 is a block diagram illustrating the structure of an image processing apparatus according to Exemplary Embodiment 1.

Image processing apparatus 1 includes control unit 11, graphics processing unit 12, memory 13, and post-effect processing unit 14. Graphics processing unit 12 includes material acquisition unit 121, material management unit 122, graphics color generation unit 123, $\alpha$ value coding unit 124, color buffer writing unit 125, color buffer reacquisition unit 126, and $\alpha$ value decoding unit 127. Post-effect processing unit 14 includes graphics color acquisition unit 141, material ID decoding unit 142, and post-effect color generation unit 143.

Control unit 11 allocates an identifier (hereinafter, referred to as a material ID) indicating whether or not a material with a color value including an $\alpha$ blend value (hereinafter, referred to as an $\alpha 0$ blend value) indicating transparency and RGB values is to be subjected to post-effect processing to the color value such that the materials have the same color value. Graphics processing unit 12 acquires the color value from memory 13. Then, control unit 11 transmits the color value to graphics processing unit 12 and post-effect processing unit 14. The material is also referred to as an image.

In addition, control unit 11 allocates a specific value among the α blend values (hereinafter, referred to as α2 blend values) generated by the graphics processing of graphics processing unit 12 as a value (hereinafter, referred to as a material ID value) indicating that the material is to be subjected to the post-effect processing so as to correspond to the material ID. Then, control unit 11 transmits the material ID value to graphics processing unit 12 and post-effect processing unit 14. The relationship between the α2 blend value and the material ID allocated by control unit 11 will be described in detail below.

Graphics processing unit 12 reads, from memory 13, the color value which forms the material and includes the α0 blend value and the RGB values. Then, graphics processing unit 12 performs graphics processing, such as shading, filtering, a texturing process, or a translucent composition process (α blending process), on the read color value to generate a color value including the α2 blend value and the RGB values and writes the generated color value to memory 13. The graphics processing corresponds to a first process. The color value read from memory 13 corresponds to a first image or the color information of the first image.

When performing the translucent composition process, graphics processing unit 12 reads the color value including the α2 blend value and the RGB values from color buffer 133 of memory 13 (Step S403) (see (a) of FIG. 9). The color value read from color buffer 133 of memory 13 corresponds to a second image or the color information of the second image.

The α0 blend value corresponds to a first α blend value of the first image. The generation of the color value by the graphics processing is also expressed by "integration". The color value generated by the graphics processing corresponds to a third image or the color information of the third image.

Specifically, when the color value read from memory 13 is not to be subjected to the post-effect processing, graphics processing unit 12 performs the graphics processing on the color value and performs the graphics processing on the basis of the material ID allocated by control unit 11 to change the generated α blend value (hereinafter, referred to as an α1 blend value) to an α2 blend value. Then, graphics processing unit 12 generates a color value including the α2 blend value and the RGB values after graphics processing and writes the generated color value in memory 13.

On the other hand, when the color value read from memory 13 is to be subjected to the post-effect processing, graphics processing unit 12 does not perform the graphics processing on the color value to change the α1 blend value to the α2 blend value, but changes the α1 blend value to a material ID value on the basis of the material ID allocated by control unit 11. Then, graphics processing unit 12 changes the material ID value to the α2 blend value. Then, graphics processing unit 12 generates a color value including the α2 blend value and the RGB values after graphics processing and writes the generated color value to memory 13. The α1 blend value corresponds to an α blend value of the third image and the α2 blend value corresponds to an α blend value of the third image after conversion.

When the read color value is not to be subjected to the post-effect processing and the α1 blend value is equal to the material ID value, graphics processing unit 12 changes the α1 blend value to a value before or after the material ID value.

When the color value which is not to be subjected to the post-effect processing is translucently synthesized with the color value which is to be subjected to the post-effect processing, graphics processing unit 12 reads the color value, which is to be subjected to the post-effect processing, from memory 13 and changes the α2 blend value included in the read color value to a value indicating complete opacity. In addition, graphics processing unit 12 performs the graphics processing on the color value, which is not to be subjected to the post-effect processing, using the changed α2 blend value, the color value including the RGB values after graphics processing, and the color value, which is not to be subjected to the post-effect processing and is translucently synthesized, and changes the generated α1 blend value to the α2 blend value on the basis of the material ID allocated by control unit 11. Then, graphics processing unit 12 writes the color value including the α2 blend value and the RGB values after graphics processing to memory 13.

Post-effect processing unit 14 reads, from memory 13, the color value including the α2 blend value and the RGB values after graphics processing, which is generated by graphics processing unit 12, performs post-effect processing, such as an edge enhancement process or a color correction process, on the basis of the read color value, and writes the color value subjected to the post-effect processing to memory 13 again.

Specifically, when the α2 blend value of the color value read from memory 13 includes the material ID value, post-effect processing unit 14 performs the post-effect processing on the color value on the basis of the color value including the α2 blend value and the RGB values after graphics processing, which is generated by graphics processing unit 12, and writes the color value after the post-effect processing to memory 13 again.

On the other hand, when the α2 blend value of the color value read from memory 13 does not include the material ID value, post-effect processing unit 14 writes the read color value to memory 13 again, without performing the post-effect processing on the color value on the basis of the color value including the α2 blend value and the RGB values after graphics processing, which is generated by graphics processing unit 12.

The components of graphics processing unit 12, memory 13, and post-effect processing unit 14 will be described in detail in the following description of the operation.

As described above, image processing apparatus 1 performs the graphics processing on the material stored in memory 13 to generate an integrated image and stores the generated integrated image in the color buffer. In addition, image processing apparatus 1 performs the post-effect processing on the integrated image stored in the color buffer to generate an output frame.

FIG. 2 is a diagram illustrating the relationship between the α2 blend value and the material ID allocated by control unit 11 of image processing apparatus 1.

The α2 blend value can be in a predetermined range (for example, a range of 0 to 255). An α2 blend value of "0" means complete transparency, that is, it means that the α blending process is performed in a completely transmissive state. An α2 blend value of "255" means complete opacity, that is, it means that the α blending process is performed in a completely opaque state. An α blend value that is greater than 0 and less than 255 means that the α blending process is performed with transparency corresponding to the magnitude of the α blend value.

Material IDs "0", "1", and "2" indicate the materials to be subjected to different types of post-effect processing and a material ID "3" indicates the material which is not to be subjected to the post-effect processing.

Control unit 11 allocates specific values (for example, α2 blend values of "1", "3", and "5") among the α2 blend values as the material ID values indicating that the material is to be subjected to the post-effect processing so as to correspond to the material IDs.

The material IDs "0" and "1" may indicate only whether the material is to be subjected to the post-effect processing or not.

It is preferable that control unit 11 sequentially allocate the specific values among the α2 blend values in descending order of transparency, as illustrated in FIG. 2. The reason is that, when the α blending process is performed with a transparency close to complete transparency, the influence of the color value to be processed is small and it is possible to reduce the influence of the color value on the image after the α blending process. It is preferable that the values which are allocated as the specific values are discrete values. As described above, when the α1 blend value is equal to the material ID value, the α1 blend value is changed to a value before or after the material ID value. The reason is that, when the specific values are discrete values, it is possible to reduce a variation in the material ID value (the difference between a value before the change and a value after the change).

The material IDs allocated by control unit 11 and the quantity of material ID values which are allocated so as to correspond to the material IDs are not limited to the above and may be changed (increase or decrease) depending on the number or type of materials to be subjected to post-effect processing.

When the α2 blend value is represented by bits, a specific bit may be allocated to the material ID.

[1-2. Operation]

The operation of image processing apparatus 1 having the above-mentioned structure will be described below.

<Graphics Processing for Material to be Subjected to Post-Effect Processing>

Hereinafter, graphics processing for the material to be subjected to post-effect processing will be described with reference to FIGS. 3, 5, and 6.

Figure 3:
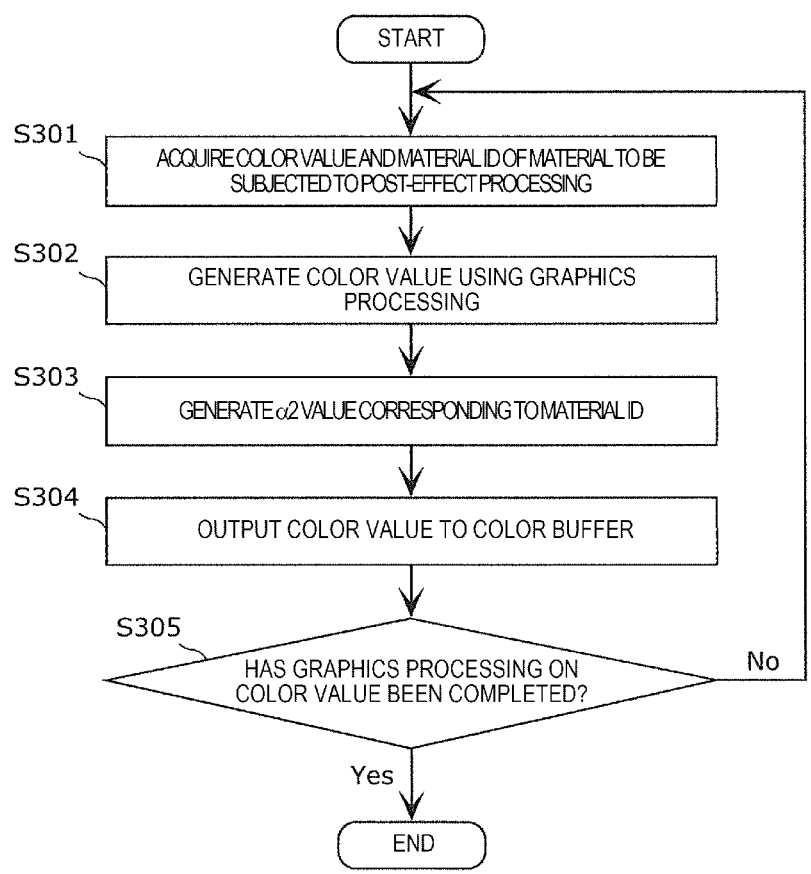
FIG. 3 is a flowchart illustrating graphics processing for a material which is to be subjected to post-effect processing in the exemplary embodiment.

FIG. 3 is a flowchart illustrating the graphics processing for the material to be subjected to post-effect processing.

FIG. 5 is a diagram illustrating a first example of the image after the graphics processing which includes a plurality of materials in the exemplary embodiment. The image after the graphics processing illustrated in FIG. 5 includes 8×8 pixels. It is assumed that the pixels represented by letters "A" and "B" are not to be subjected to the post-effect processing and the pixels represented by letters "C", "D", and "E" are to be subjected to the post-effect processing. For convenience of explanation, the position of each pixel is shown in parentheses. For example, (1, 1) indicates that the pixel is disposed in the first row and the first column.

FIG. 6 is a diagram illustrating a first example of the graphics processing for the α blend value in the exemplary embodiment. (a) of FIG. 6 illustrates the α0 blend value of the color value which is extracted from the material to be subjected to post-effect processing in order to generate the color value of a pixel D(4, 7) using the graphics processing and the material ID which is allocated to the material by control unit 11. As described with reference to FIG. 2, it is assumed that the materials with material IDs 0, 1, and 2 are to be subjected to the post-effect processing. The RGB values of the extracted color value are not illustrated. (b) of FIG. 6 illustrates the α1 blend value of the pixel D(4, 7) which is generated by performing the graphics processing on the extracted α0 blend value and (c) of FIG. 6 illustrates the α2 blend value of the pixel D(4, 7).

Material acquisition unit 121 reads the color value including the α0 blend value and RGB values of the material (corresponding material 131 to be subjected to post-effect processing) to be subjected to the post-effect processing from color buffer 133 of memory 13 and transmits the color value to graphics color generation unit 123, under the control of control unit 11.

When Step S304, which will be described below, is performed, the materials stored in color buffer 133 are the RGB values and the α blend value generated by, for example, graphics color generation unit 123. Before Step S304 is performed, color buffer 133 is treated to store materials including insignificant RGB values and α blend values.

Material management unit 122 manages the material ID of each material allocated by control unit 11 and transmits, to graphics color generation unit 123, the material ID of the material including the color value which is transmitted from material acquisition unit 121 to graphics color generation unit 123.

Graphics color generation unit 123 acquires the color value of the material to be subjected to the post-effect processing and the material ID of the material from material acquisition unit 121 and material management unit 122 (Step S301) (see (a) of FIG. 6).

Then, graphics color generation unit 123 performs the graphics processing on the acquired color value to generate the α1 blend value and the RGB values after graphics processing (Step S302) (see (b) of FIG. 6). Graphics color generation unit 123 transmits the generated α1 blend value and the acquired material ID to α value coding unit 124. In addition, graphics color generation unit 123 transmits the RGB values after graphics processing to color buffer writing unit 125.

α value coding unit 124 acquires the α1 blend value and the material ID from graphics color generation unit 123. α value coding unit 124 changes the acquired α1 blend value to the material ID value which is allocated so as to correspond to the material ID by control unit 11 (Step S303) (see (c) of FIG. 6) and transmits the material ID value as the α2 blend value to color buffer writing unit 125.

Color buffer writing unit 125 acquires the α2 blend value, which is the material ID value, and the RGB values after graphics processing from graphics color generation unit 123 and α value coding unit 124 and writes the acquired values to color buffer 133 of memory 13 (Step S304).

Material acquisition unit 121, material management unit 122, graphics color generation unit 123, α value coding unit 124, and color buffer writing unit 125 perform the process from Step S301 to Step S304 on all of the color values to be subjected to the graphics processing, under the control of control unit 11 (Step S305). Specifically, until the process from Step S301 to Step S304 on all of the color values to be subjected to the graphics processing is completed, these units repeatedly perform the process while changing the target color value. At the time the process is completed, a series of processes illustrated in FIG. 3 ends.

<Graphics Processing for Material which is not to be Subjected to Post-Effect Processing>

Hereinafter, the graphics processing on the material which is not to be subjected to the post-effect processing will be described with reference to FIGS. 4, 7, 8, and 9.

Figure 4:
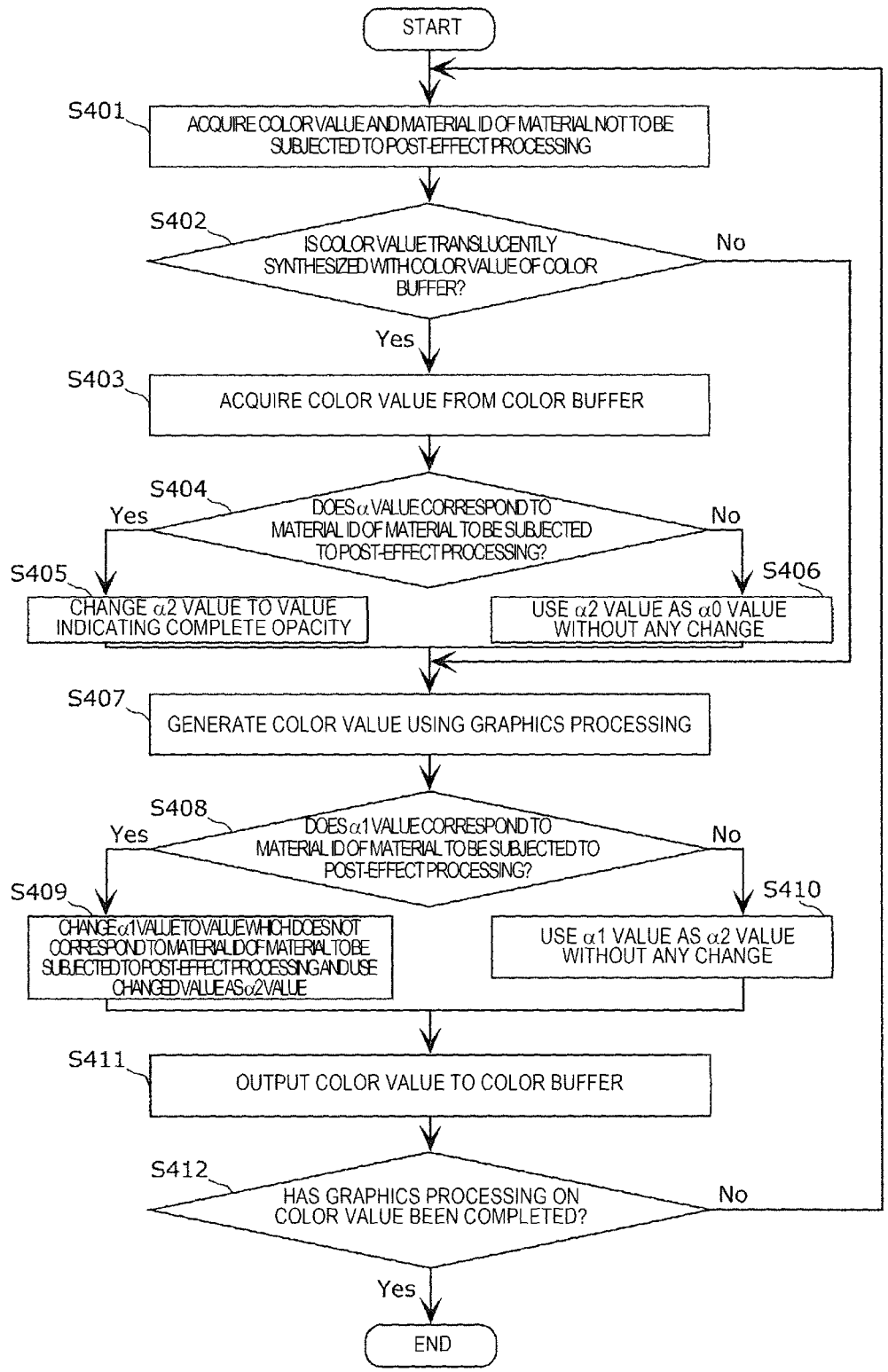
FIG. 4 is a flowchart illustrating graphics processing for a material which is not to be subjected to the post-effect processing in the exemplary embodiment.

FIG. 4 is a flowchart illustrating the graphics processing on the material which is not to be subjected to the post-effect processing.

FIG. 7 is a diagram illustrating a second example of the image after the graphics processing which includes a plurality of materials in the exemplary embodiment. FIG. 7 differs from FIG. 5 in that a pixel which is arranged in the fourth row and the seventh column is obtained by synthesizing a pixel B(4, 7), which is not to be subjected to the post-effect processing, with a pixel D(4, 7) which is to be subjected to the post-effect processing.

FIG. 8 is a diagram illustrating a second example of the graphics processing on the $\alpha$ blend value in the exemplary embodiment. Similarly to (a) of FIG. 6, (a) of FIG. 8 illustrates the $\alpha 0$ blend value of the color value that is extracted from the material, which is not to be subjected to the post-effect processing, in order to generate the color value of a pixel B(2, 7) using the graphics processing and the material ID which is allocated to the material by control unit 11. As described with reference to FIG. 2, it is assumed that a material with a material ID 3 is the material which is not to be subjected to the post-effect processing. The RGB values of the extracted color value are not illustrated. (b) of FIG. 8 illustrates the $\alpha 1$ blend value of the pixel B(2, 7) which is generated by performing the graphics processing on the extracted $\alpha 0$ blend value and (c) of FIG. 8 illustrates the $\alpha 2$ blend value of the pixel B(2, 7).

FIG. 9 is a diagram illustrating a third example of the graphics processing on the $\alpha$ blend value in the exemplary embodiment. (a) of FIG. 9 illustrates an $\alpha 2$ blend value that is generated by performing the graphics processing on the pixel D(4, 7) which is to be subjected to the post-effect processing. The RGB values in the color value of the pixel D(4, 7) are not illustrated. (b) of FIG. 9 illustrates a state in which the $\alpha 2$ blend value of the pixel D(4, 7) is changed to a value indicating complete opacity and (c) of FIG. 9 illustrates a state in which the $\alpha 2$ blend value of the pixel D(4, 7) changed to the value indicating complete opacity is changed to the $\alpha 0$ blend value.

Material acquisition unit 121 reads the color value including the $\alpha 0$ blend value and the RGB values of the material, which is not to be subjected to the post-effect processing, from memory 13 and transmits the color value to graphics color generation unit 123, under the control of control unit 11.

Material management unit 122 manages the material ID of each material allocated by control unit 11 and transmits the material ID of the material having the color value, which is transmitted to graphics color generation unit 123 by material acquisition unit 121, to graphics color generation unit 123.

Graphics color generation unit 123 acquires the color value of the material (corresponding to material 132 which is not to be subjected to the post-effect processing), which is not to be subjected to the post-effect processing, and the material ID of the material from material acquisition unit 121 and material management unit 122 (Step S401) (see (a) of FIG. 8).

Then, when the color value is not translucently synthesized with the color value which has been subjected to the graphics processing (No in Step S402), graphics color generation unit 123 performs the graphics processing on the acquired color value to generate an $\alpha 1$ blend value and RGB values after graphics processing, under the control of control unit 11 (Step S407) (see (b) of FIG. 8). Graphics color generation unit 123 transmits the generated $\alpha 1$ blend value and the acquired material ID to $\alpha$ value coding unit 124. In addition, graphics color generation unit 123 transmits the RGB values after graphics processing to color buffer writing unit 125.

$\alpha$ value coding unit 124 acquires the $\alpha 1$ blend value and the material ID from graphics color generation unit 123. When the acquired $\alpha 1$ blend value is equal to the material ID value which is allocated so as to correspond to the material ID of each material allocated by control unit 11 (Yes in Step S408), $\alpha$ value coding unit 124 changes the acquired $\alpha 1$ blend value to a value before or after the acquired $\alpha 1$ blend value and uses the changed $\alpha 1$ blend value as the $\alpha 2$ blend value (Step S409) (see (c) of FIG. 8). The above-mentioned conversion corresponds to a conversion process for allocating an identifier to a portion of a possible range of the $\alpha$ blend value.

The change of the $\alpha 1$ blend value to a value before or after the $\alpha 1$ blend value means that the $\alpha 1$ blend value is changed to a value that is 1 greater than the $\alpha 1$ blend value or a value that is 1 less than the $\alpha 1$ blend value. When the changed value is also equal to the material ID value which is allocated so as to correspond to the material ID, the $\alpha 1$ blend value is changed to a value that is 1 greater than the changed value or a value that is 1 less than the changed value.

For example, in FIG. 8, the $\alpha 1$ blend value=5 which is generated by performing the graphics processing on the $\alpha 0$ blend value (=6) of the pixel B(2, 7) is equal to the material ID value=5 among the material ID values=1, 3, and 5 that are allocated so as to correspond to the material IDs=0, 1, and 2 of each material allocated by control unit 11. Therefore, $\alpha$ value coding unit 124 changes the $\alpha 1$ blend value=5 generated by graphics color generation unit 123 to a value (for example, the $\alpha 1$ blend value=4) before or after the material ID value and uses the changed $\alpha 1$ blend value as the $\alpha 2$ blend value.

On the other hand, when the acquired $\alpha 1$ blend value is different from the material ID value which is allocated so as to correspond to the material ID of each material allocated by control unit 11 (No in Step S408), $\alpha$ value coding unit 124 uses the acquired $\alpha 1$ blend value as the $\alpha 2$ blend value without any change (that is, maintains the $\alpha 1$ blend and generates the $\alpha 2$ blend value corresponding to the $\alpha 1$ blend value) (Step S410). In this case, the generation of the $\alpha 2$ blend value from the $\alpha 1$ blend value is referred to as conversion for allocating an identifier to a portion of a possible range of the $\alpha$ blend value.

Since the operation in Step S411 and Step S412 is the same as that in Step S304 and Step S305 of FIG. 3, the description thereof will not be repeated here.

Returning to Step S402, when the color value is translucently synthesized with the color value which has been subjected to the graphics processing (Yes in Step S402), color buffer reacquisition unit 126 reads a color value including the $\alpha 2$ blend value and the RGB values of the color value which has been subjected to the graphics processing from memory 13, under the control of control unit 11 (Step S403) (see (a) of FIG. 9).

Then, color buffer reacquisition unit 126 transmits the $\alpha 2$ blend value of the color value acquired from memory 13 to $\alpha$ value decoding unit 127 and transmits the RGB values of the color value to graphics color generation unit 123.

When the $\alpha 2$ blend value acquired from color buffer reacquisition unit 126 is equal to the material ID value which is allocated so as to correspond to the material ID of each material allocated by control unit 11 (Yes in Step S404), $\alpha$ value decoding unit 127 changes the acquired $\alpha 2$ blend value to a value ($\alpha 2$ blend=255) indicating complete opacity (see (b) of FIG. 9) and transmits the value as the $\alpha 0$ blend value to graphics color generation unit 123 (see (c) of FIG. 9) (Step S405). On the other hand, when the α2 blend value acquired from color buffer reacquisition unit 126 is different from the material ID value which is allocated so as to correspond to the material ID of each material allocated by control unit 11 (No in Step S404), α value decoding unit 127 transmits the acquired α2 blend value as the α0 blend value to graphics color generation unit 123, without any change (Step S406).

Graphics color generation unit 123 performs the graphics processing on the color value, which is translucently synthesized and is not to be subjected to the post-effect processing, on the basis of the material ID given by control unit 11, using the color value including the α0 blend value and the RGB values acquired from α value decoding unit 127 and color buffer reacquisition unit 126 and the color value of the pixel, which is translucently synthesized and is not to be subjected to the post-effect processing, acquired from material acquisition unit 121 and material management unit 122 (Step S407).

<Post-Effect Processing>

Figure 10:
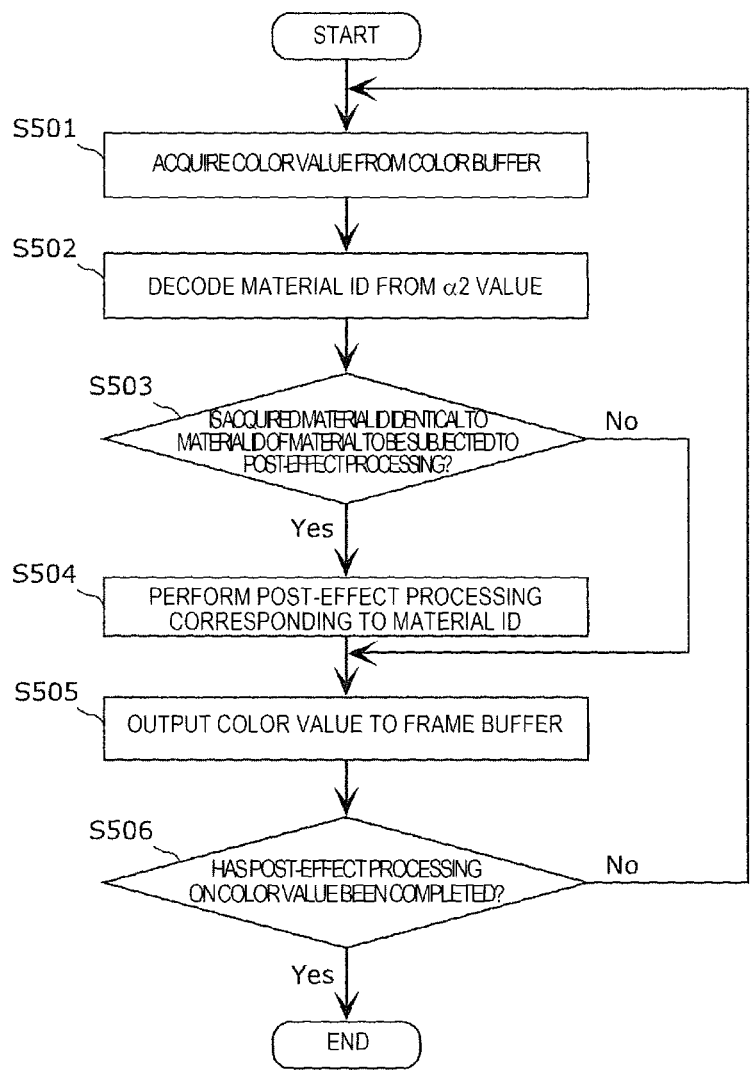
FIG. 10 is a flowchart illustrating the post-effect processing according to the exemplary embodiment.

FIG. 10 is a flowchart illustrating the post-effect processing.

Graphics color acquisition unit 141 reads a color value including the α2 blend value and the RGB values of the color value subjected to the graphics processing by graphics processing unit 12, which is stored in color buffer 133 of memory 13 (Step S501). Here, the read color value has been subjected to the graphics processing by graphics processing unit 12.

Graphics color acquisition unit 141 transmits the α2 blend value of the color value acquired from memory 13 to material ID decoding unit 142 and transmits the RGB values of the color value to post-effect color generation unit 143.

Material ID decoding unit 142 acquires the α2 blend value from graphics color acquisition unit 141. Material ID decoding unit 142 decodes the material ID from the acquired α2 blend value, on the basis of the material ID acquired from control unit 11 and the material ID value which is allocated so as to correspond to the material ID, and transmits the decoded material ID to post-effect color generation unit 143 (Step S502).

When the color value is to be subjected to the post-effect processing on the basis of the material ID acquired from material ID decoding unit 142 (Yes in Step S503), post-effect color generation unit 143 performs post-effect processing corresponding to the material ID on the color value (Step S504) and writes the color value subjected to the post-effect processing to frame buffer 134 of memory 13 (Step S505).

On the other hand, when the color value is not to be subjected to the post-effect processing on the basis of the material ID acquired from material ID decoding unit 142 (No in Step S503), post-effect color generation unit 143 writes the color value read from memory 13 to frame buffer 134 of memory 13 again, without performing the post-effect processing corresponding to the material ID on the color value (Step S505).

Graphics color acquisition unit 141, material ID decoding unit 142, and post-effect color generation unit 143 perform the process from Step S501 to Step S505 on all of the color values in memory 13, which have been subjected to the graphics processing by graphics processing unit 12, under the control of control unit 11 (Step S506). Specifically, until the process from Step S501 to Step S505 on all of the color values subjected to the graphics processing is completed, these units repeatedly perform the process while changing the target color value. At the time the process is completed, the series of processes illustrated in FIG. 10 ends.

A frame having the color value stored in frame buffer 134 is a frame (image) which is output to the outside by image processing apparatus 1.

Figure 11:
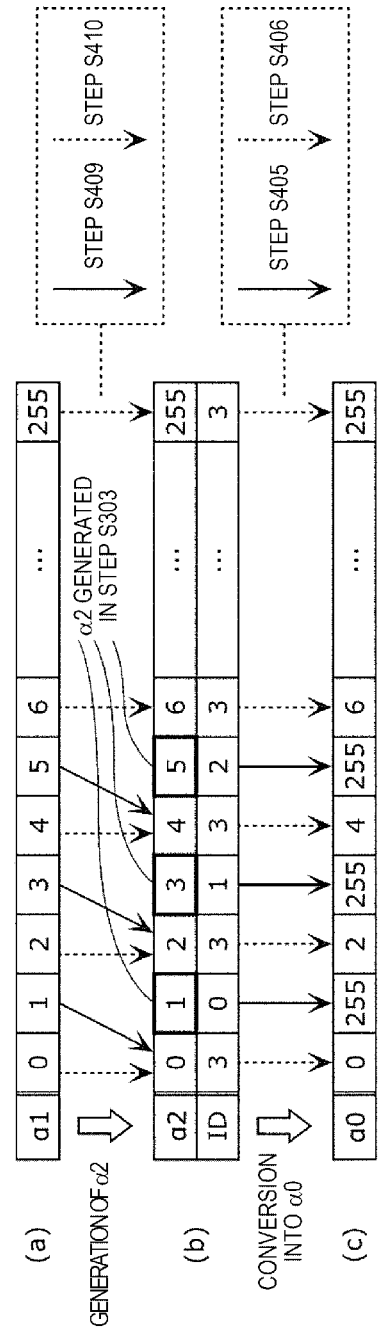
FIG. 11 is a diagram illustrating an $\alpha$ blend value conversion process according to the exemplary embodiment.

FIG. 11 is a diagram illustrating an α blend value conversion process according to the exemplary embodiment. A process of generating the α2 blend value using the α1 blend value and the identifier and a process of converting the α2 blend value into the α1 blend value will be described with reference to FIG. 11.

(a) of FIG. 11 illustrates the range of the α1 blend value included in the color value which is generated by the graphics processing in Step S302 or Step S403.

(b) of FIG. 11 illustrates the α2 blend value which is generated on the basis of whether the pixel is to be subjected to the post-effect processing or not, using the α1 blend value illustrated in (a) of FIG. 11 and the identifier.

A specific value (for example, 1, 3, or 5) corresponding to the material ID of the material to be subjected to post-effect processing is set to the α2 blend value included in the color value of the pixel which is to be subjected to the post-effect processing in Step S303.

On the other hand, the same value as the α1 blend value is set to the α2 blend value included in the color value of the pixel which is not to be subjected to the post-effect processing in Step S409 when the α1 blend value of the pixel is not equal to the specific value. A value greater or less than the α1 blend value is set to the α2 blend value in Step S410 when the α1 blend value of the pixel is equal to the specific value.

(c) of FIG. 11 illustrates the α0 blend value converted from the α2 blend value when the pixel having the α2 blend value illustrated in (b) of FIG. 11 is subjected to the graphics processing again.

When the α2 blend value of the pixel is not equal to the specific value, the same value as the α2 blend value is set to the α0 blend value in Step S406. When the α2 blend value of the pixel is equal to the specific value, a value of 255 (value indicating complete opacity) is set to the α0 blend value in Step S405.

Figure 12:
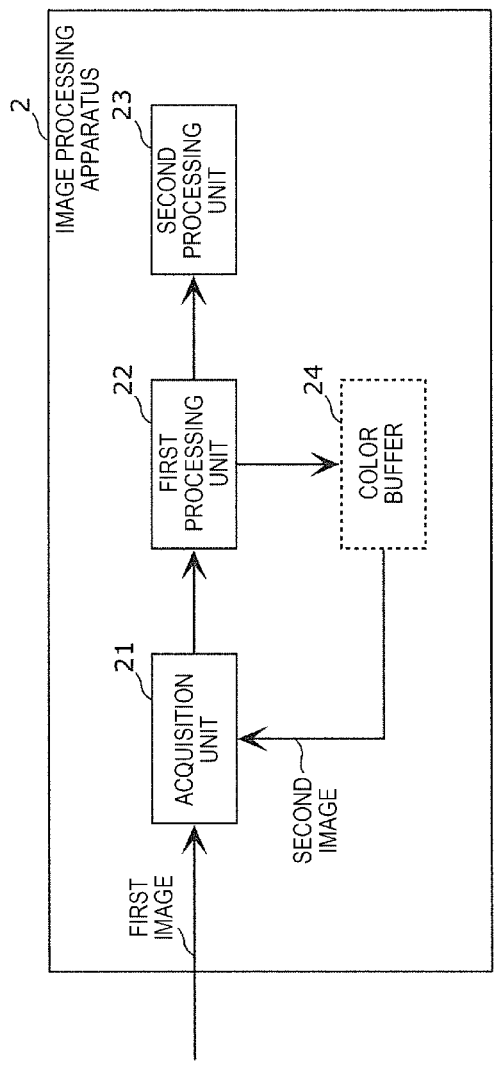
FIG. 12 is a block diagram illustrating another example of the image processing apparatus according to the exemplary embodiment.

FIG. 12 is a block diagram illustrating image processing apparatus 2 which is another example of image processing apparatus 1 according to this exemplary embodiment.

As illustrated in FIG. 12, image processing apparatus 2 according to this exemplary embodiment performs a first process and a second process. The first process is image processing that integrates a first image which has color information including a brightness of each pixel forming the image and an α blend value, which is a coefficient indicating a transparency of each pixel, and a second image having color information to generate a third image having color information. The second process is image processing for the third image. Image processing apparatus 2 comprises: acquisition unit 21 that acquires the first image, the second image, and an identifier indicating whether or not a portion corresponding to the first image and included in the third image is to be subjected to the second process; first processing unit 22 that (i) performs the first process on the first and second images acquired by acquisition unit 21 to generate the third image and (ii) performs conversion on the α blend value of each pixel forming the generated third image for allocating the identifier to a portion of a possible range of the α blend value; and second processing unit 23 that controls whether or not to perform the second process on each pixel forming the third image generated by first processing unit 22, on the basis of the converted α blend value.

In this exemplary embodiment, control unit 11 corresponds to a control unit, graphics processing unit 12 corresponds to a first processing unit, post-effect processing unit 14 corresponds to a second processing unit, and material acquisition unit 121 corresponds to an acquisition unit.

For example, a texture image or polygon vertex data and a constant value associated with a polygon model are given as examples of the material which is read from memory 13 by material acquisition unit 121 and is to be subjected to the post-effect processing and the material which is read from memory 13 by material acquisition unit 121 and is not to be subjected to the post-effect processing. In addition, material acquisition unit 121 may read a material which is to be subjected to the post-effect processing and a material which is not to be subjected to the post-effect processing from memory 13, calculate the color value of each polygon vertex using, for example, a vertex shader, and transmit a color value generated by interpolating the color values of the vertices of the polygon to graphics color generation unit 123.

In this case, an aggregate of the pixels generated by a polygon interpolation process of graphics processing unit 12 corresponds to the first image.

When performing the graphics processing using a plurality of color values with different material IDs, which are to be subjected to the post-effect processing, to generate one color value, graphics color generation unit 123 may transmit the material ID, which is not to be subjected to the post-effect processing, to $\alpha$ value coding unit 124 or may transmit any one of a plurality of material IDs of the material to be subjected to the post-effect processing to $\alpha$ value coding unit 124.

Similarly, when performing the graphics processing using a plurality of color values with different material IDs of the material to be subjected to the post-effect processing to generate one color value, graphics color generation unit 123 may transmit the largest quantity of material IDs to $\alpha$ value coding unit 124.

In this case, it is possible to perform post-effect processing most suitable for the one color value.

When performing the graphics processing using a color value, to which the material ID that is to be subjected to the post-effect processing is given, and a color value, to which the material ID that is not to be subjected to the post-effect processing is given, to generate one color value, graphics color generation unit 123 may transmit the material ID that is not to be subjected to the post-effect processing to $\alpha$ value coding unit 124.

In this case, it is possible to prevent post-effect processing other than target post-effect processing from being performed on the one color value.

In this exemplary embodiment, the $\alpha 2$ blend value="0" indicates complete transparency and the $\alpha 2$ blend value="255" indicates complete opacity. However, conversely, the $\alpha 2$ blend value="255" may indicate complete transparency and the $\alpha 2$ blend value="0" may indicate complete opacity.

The $\alpha 2$ blend value is in the range of "0" to "255". However, the $\alpha 2$ blend value may be, for example, in a narrow range of "0" to "15" or a wide range of "0" to "1023".

In this exemplary embodiment, the color value includes the RGB values. However, the color value may be a value in other color spaces, such as a YUV value or an HSV value, or it may be a value indicating intermediate data for generating the color value, such as a color index value, a normal vector value, or a depth value.

For example, image processing apparatus 1 includes an integrated circuit having a central processing unit (CPU) and a graphics processing unit (GPU) mounted thereon. However, the structure of the internal functional blocks of the image processing apparatus is not limited thereto. For example, a processor may interpret and execute a program stored in the memory to implement some or all of the functional blocks, or a field programmable gate array (FPGA) whose hardware configuration can be changed after manufacture or a reconfigurable processor which can reconfigure the connection or setting of a circuit cell in an integrated circuit after manufacture may be used to implement some or all of the functional blocks.

In addition, some or all of the functional blocks may be implemented by a recording medium having the program recorded thereon, such as a computer-readable compact disc-read only memory (CD-ROM), or they may be implemented by information, data, or signals indicating the program. The program, information, data, and signals may be distributed through a communication network such as the Internet.

[1-3. Effect and Others]

Image processing apparatus 1 according to the present disclosure performs a first process and a second process. The first process is image processing that integrates a first image which has color information including the brightness of each pixel forming the image and an $\alpha$ blend value, which is a coefficient indicating the transparency of each pixel, and a second image having color information to generate a third image having color information. The second process is image processing for the third image. Image processing apparatus 1 comprises: the material acquisition unit 121 that acquires the first image, the second image, and an identifier indicating whether or not a portion corresponding to the first image and included in the third image is to be subjected to the second process; graphics processing unit 12 that (i) performs the first process on the first and second images acquired by material acquisition unit 121 to generate the third image and (ii) performs conversion on the $\alpha$ blend value of each pixel forming the generated third image for allocating the identifier to a portion of a possible range of the $\alpha$ blend value; and post-effect processing unit 14 that controls whether or not to perform the second process on each pixel forming the third image generated by graphics processing unit 12, on the basis of the converted $\alpha$ blend value.

According to this structure, image processing apparatus 1 changes the $\alpha$ blend value, which is generated by performing the first process on the color information to be subjected to the second process, to a specific value on the basis of the identifier indicating whether or not the image is to be subjected to the second process, generates color information including the specific value as a second $\alpha$ blend value, and performs the second process on the color information on the basis of the color information. Therefore, image processing apparatus 1 does not need to hold information indicating that the image is to be subjected to the second process, separately from the color information, and can reduce memory capacity required for image processing.

In contrast, in an image processing apparatus according to the related art, when the first process and the second process are performed on a target image, it is necessary to hold information indicating that the image is to be subjected to the second process, separately from the color information including the $\alpha$ blend value required for the first process. As the size of the image to be processed by the image processing apparatus increases, the amount of information to be held increases.

Image processing apparatus 1 according to this exemplary embodiment does not need to hold the information indicating that the image is to be subjected to the second process, separately from the color information, and can reduce memory capacity and a band required for access to the memory.

In the conversion, when a portion corresponding to the first image and included in the third image is to be subjected to the second process, graphics processing unit 12 may change the α blend value of a pixel included in the portion to a specific value indicating that the portion is to be subjected to the second process. When the portion is not to be subjected to the second process, graphics processing unit 12 may change the α blend value of the pixel included in the portion to a value other than the specific value.

According to this structure, specifically, image processing apparatus 1 uses the specific value. Therefore, image processing apparatus 1 does not hold information indicating that the image is to be subjected to the second process and can reduce memory capacity required for image processing.

Graphics processing unit 12 may perform the conversion, using discrete values in the possible range of the α blend value as the specific value in descending order of transparency.

According to this structure, image processing apparatus 1 does not need to hold information indicating that the image is to be subjected to the second process, separately from the color information including the α blend value, and can reduce an influence on the possibility that the specific value will not be used as the α blend value generated by the first process, while reducing memory capacity required for image processing. In addition, a value (that is greater than or smaller than by 1 (one)) before or after the specific value can be used as the α blend value generated by the first process. Therefore, image processing apparatus 1 can suppress an error in the α blend value due to the first process.

In the conversion, in the case in which the portion is not to be subjected to the second process, graphics processing unit 12 (i) may change the α blend value to a value that is greater than or smaller than the α blend value by 1 (one) when the α blend value of the pixel included in the portion is equal to the specific value and (ii) may maintain the α blend value when the α blend value of the pixel included in the portion is different from the specific value.

According to this structure, image processing apparatus 1 does not need to hold the information indicating that the image is to be subjected to the second process, separately from the color information including the α blend value, and can distinguish the α blend value of the color information which is not to be subjected to the second process from an identification value so as not to confuse the α blend value with the identification value, while reducing memory capacity required for image processing. Therefore, image processing apparatus 1 can prevent the second process from being erroneously performed on the color information which is not to be subjected to the second image process and can suppress an error in the α blend value generated by the first process.

When integrating a first target pixel that forms the first image and is included in a portion corresponding to the first image and included in the third image, which is not to be subjected to the second process, and a second target pixel that forms the second image and is included in a portion corresponding to the second image included in the third image and is to be subjected to the second process, graphics processing unit 12 may change the α blend value of the second target pixel to a value indicating complete opacity and may perform the first process on the first image and the second image on the basis of the color information of the changed second target pixel and the color information of the first target pixel.

According to this structure, image processing apparatus 1 does not need to hold the information indicating that the image is to be subjected to the second process, separately from the color information including the α blend value, and can synthesize the color information which is not to be subjected to the second process with the color information including pixel information to be subjected to the second process, while reducing memory capacity required for image processing.

Graphics processing unit 12 may increase or decrease the specific value or the quantity of specific values according to the number or type of first images.

According to this structure, image processing apparatus 1 does not need to hold the information indicating that the image is to be subjected to the second process, separately from the color information including the α blend value, and can minimize the quantity of specific values which are not used as the α blend value generated by the first process, while reducing memory capacity required for image processing. Therefore, image processing apparatus 1 can suppress an error in the α blend value generated by the first process.

The second process may include any one of a plurality of different types of image processing. The identifier may indicate whether or not the portion is to be subjected to the second process. When the portion is to be subjected to the second process, the identifier may indicate the type of image processing included in the second process. Post-effect processing unit 14 may control whether or not to perform the second process on each pixel forming the third image generated by graphics processing unit 12, on the basis of the converted α blend value. When performing the second process, post-effect processing unit 14 may control the type of image processing included in the second process.

According to this structure, image processing apparatus 1 does not need to hold the information indicating that the image is to be subjected to the second process, separately from the color information including the α blend value, and can perform a plurality of types of image processing as the second process.

Image processing apparatus 1 may further include color buffer 133 which stores an image. Graphics processing unit 12 may store the generated third image in color buffer 133. Material acquisition unit 121 may acquire the image stored in color buffer 133 as the second image. Post-effect processing unit 14 may acquire the image stored in color buffer 133 to acquire the third image generated by graphics processing unit 12.

According to this structure, image processing apparatus 1 can perform the first process again such that another image is integrated with the image subjected to the first process. In addition, image processing apparatus 1 can perform the second process on the image subjected to a plurality of first processes. Therefore, image processing apparatus 1 can appropriately perform the first process and the second process on a plurality of images.

An image processing method according to the present disclosure is performed in image processing apparatus 1 that performs a first process and a second process. The first process is image processing that integrates a first image which has color information including a brightness of each pixel forming the image and an α blend value, which is a coefficient indicating a transparency of each pixel, and a second image having color information to generate a third image having color information. The second process is image processing for the third image. The image processing method comprises: an acquisition step of acquiring the first image, the second image, and an identifier indicating whether or not a portion corresponding to the first image and included in the third image is to be subjected to the second process; a first processing step of (i) performing the first process on the first and second images acquired in the acquisition step to generate the third image and of (ii) performing conversion on the α blend value of each pixel forming the generated third image for allocating the identifier to a portion of a possible range of the α blend value; and a second processing step of controlling whether or not to perform the second process on each pixel forming the third image generated in the first processing step, on the basis of the converted α blend value.

According to this structure, it is possible to obtain the same effect as that in image processing apparatus 1.

The present disclosure can be applied to an image processing apparatus which reduces memory capacity required for image processing. Specifically, the present disclosure can be applied to, for example, a television and a video recorder.

The exemplary embodiment has been described as an example of the technique according to the present disclosure. The accompanying drawings and the detailed description are provided for the exemplary embodiment.

Therefore, the components described in the accompanying drawings and the detailed description may include components which are not indispensable for solving the problem in order to exemplify the mounting, in addition to components which are indispensable for solving the problems. Therefore, the dispensable components which are described in the accompanying drawings or the detailed description should not be definitely regarded as the indispensable components.

The above-described exemplary embodiment is an example of the technique according to the present disclosure and it will be apparent that various changes, substitutions, additions, and omissions can be made in the scope of the claims or equivalents thereto.

What is claimed is:

1. An image processing apparatus that performs a first process and a second process, the first process being image processing that integrates a first image which has color information including a brightness of each pixel forming the image and an α blend value, which is a coefficient indicating a transparency of each pixel, and a second image having color information to generate a third image having color information, the second process being image processing for the third image, the image processing apparatus comprising:
   an acquisition unit that acquires the first image, the second image, and an identifier indicating whether or not a portion corresponding to the first image and included in the third image is to be subjected to the second process;
   a first processing unit that (i) performs the first process on the first and second images acquired by the acquisition unit to generate the third image and (ii) performs conversion on the blend value of each pixel forming the generated third image for allocating the identifier to one of one or more specific values of a possible range of the α blend value, wherein, in a case in which the portion is not to be subjected to the second process, in the conversion, the first processing unit (i) changes the α blend value to a value greater than or smaller than the α blend value by a predetermined integer when the α blend value of the pixel included in the portion is equal to one of the one or more specific values, and (ii) maintains the α blend value when the α blend value of the pixel included in the portion is different from any of the one or more specific values; and
   a second processing unit that controls whether or not to perform the second process on each pixel forming the third image generated by the first processing unit, on the basis of the converted blend value,
   wherein the second process is performed when the converted blend value is determined to be equal to one of the one or more specific values, and wherein the second process is not performed when the converted blend value is determined not to be equal to any of the one or more specific values, and
   wherein by reserving the one or more specific values of the possible range of the α blend value for the identifier to control the second process, the image processing apparatus reduces memory usage for the identifier.

2. The image processing apparatus of claim 1, wherein the first processing unit performs the conversion, using discrete values in the possible range of the α blend value as the specific value in descending order of transparency of the α blend value.

3. The image processing apparatus of claim 1, wherein, when integrating a first target pixel that forms the first image and is included in the portion corresponding to the first image and included in the third image, which portion is not to be subjected to the second process, and a second target pixel that forms the second image and is included in a portion corresponding to the second image and included in the third image, which portion is to be subjected to the second process, the first processing unit changes the α blend value of the second target pixel to a value indicating complete opacity and performs the first process on the first image and the second image on the basis of color information of the changed second target pixel and color information of the first target pixel.

4. The image processing apparatus of claim 1, wherein the first processing unit increases or decreases the specific value or a quantity of specific values according to a quantity or type of first images.

5. The image processing apparatus of claim 1, wherein the second process includes any one of a plurality of different types of image processing,
   the identifier indicates whether or not the portion is to be subjected to the second process,
   when the portion is to be subjected to the second process, the identifier indicates the type of image processing included in the second process,
   the second processing unit controls whether or not to perform the second process on each pixel forming the third image generated by the first processing unit, on the basis of the converted α blend value, and
   when performing the second process, the second processing unit controls the type of image processing included in the second process.

6. The image processing apparatus of claim 1, further comprising:
   a color buffer that stores an image,
   wherein the first processing unit stores the generated third image in the color buffer,
   the acquisition unit acquires the image stored in the color buffer as the second image, and the second processing unit acquires the image stored in the color buffer to acquire the third image generated by the first processing unit.

7. An image processing method performed in an image processing apparatus that performs a first process and a second process, the first process being image processing that integrates a first image which has color information including a brightness of each pixel forming the image and an $\alpha$ blend value, which is a coefficient indicating a transparency of each pixel, and a second image having color information to generate a third image having color information, the second process being image processing for the third image, the image processing method comprising:

acquiring the first image, the second image, and an identifier indicating whether or not a portion corresponding to the first image and included in the third image is to be subjected to the second process;

(i) performing the first process on the acquired first and second images to generate the third image and (ii) performing conversion on the $\alpha$ blend value of each pixel forming the generated third image for allocating the identifier to one of one or more specific values of a possible range of the $\alpha$ blend value, wherein, in a case in which the portion is not to be subjected to the second process, in the conversion, (i) changing the $\alpha$ blend value to a value greater than or smaller than the $\alpha$ blend value by a predetermined integer when the $\alpha$ blend value of the pixel included in the portion is equal to one of the one or more specific values, and (ii) maintaining the $\alpha$ blend value when the a $\alpha$ blend value of the pixel included in the portion is different from any of the one or more specific values; and controlling whether or not to perform the second process on each pixel forming the generated third image, on the basis of the converted $\alpha$ blend value, wherein the second process is performed when the converted $\alpha$ blend value is determined to be equal to one of the one or more specific values, and wherein the second process is not performed when the converted $\alpha$ blend value is determined not to be equal to any of the one or more specific values, and wherein by reserving the one or more specific values of the possible range of the $\alpha$ blend value for the identifier to control the second process, the image processing apparatus reduces memory usage for the identifier.

\* \* \* \* \*